Aug. 2, 1938.  C. R. HENNICKE  2,125,611
TRAILER COUPLING
Filed Sept. 26, 1936   2 Sheets-Sheet 1
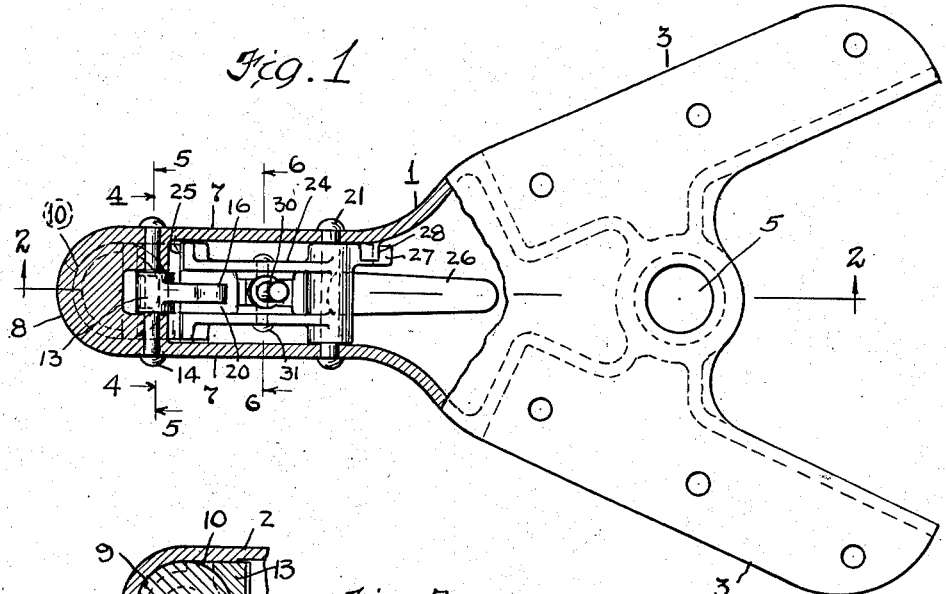
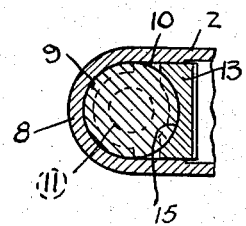
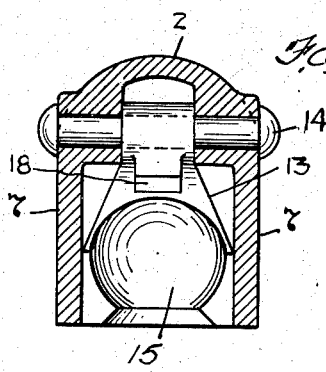
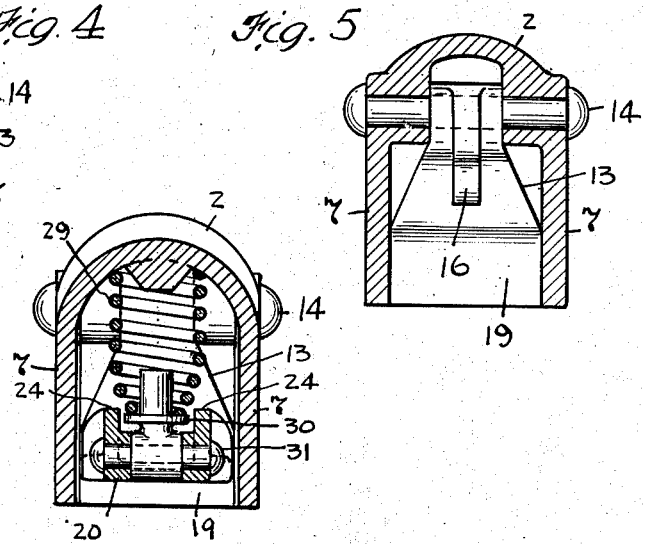
INVENTOR.
Carl R. Hennicke
BY Fay Oberlin & Fay
ATTORNEYS.

Aug. 2, 1938.   C. R. HENNICKE   2,125,611
TRAILER COUPLING
Filed Sept. 26, 1936   2 Sheets-Sheet 2
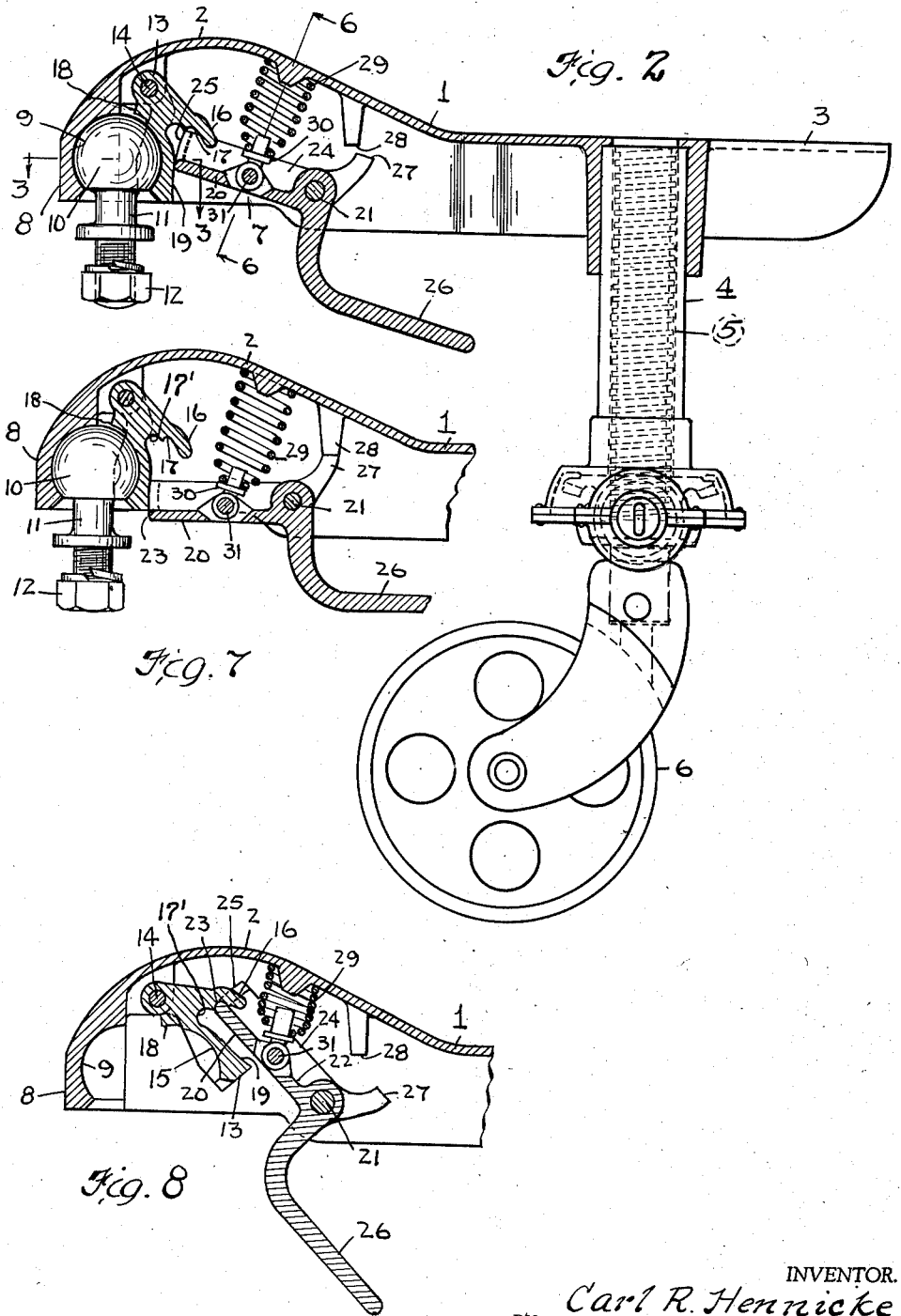
INVENTOR.
Carl R. Hennicke
BY Fay, Oberlin & Fay
ATTORNEYS.

Patented Aug. 2, 1938

2,125,611

UNITED STATES PATENT OFFICE 2,125,611

TRAILER COUPLING

Carl R. Hennicke, Cleveland Heights, Ohio, assignor to The Eastern Malleable Iron Company, Naugatuck, Conn., a corporation of Connecticut Application September 26, 1936, Serial No. 102,643

5 Claims. (Cl. 280—33.15)

This invention relates, as indicated, to couplings for trailers, but has reference more particularly to a coupling of this character which is especially adapted for use in connection with the towing of house trailers by passenger automobiles, although it is to be understood that the coupling may be used generally for tractor-trailer and similar commercial vehicle combinations.

Among other objects of the invention are to provide a coupling of the character described, which is effective to securely couple the towing car and trailer under all conditions likely to be encountered during traveling, which is entirely devoid of loose parts which are likely to cause rattling or become lost or broken; through the use of which coupling is automatically effected and in which wear of certain of the parts is automatically taken up or compensated.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Fig. 1 is a view partly in plan and partly in section of the novel coupling;

Fig. 2 is a longitudinal cross-sectional view, taken on the line 2—2 of Fig. 1, and showing the coupling locking and unlocking lever in partially unlocked position;

Fig. 3 is a fragmentary horizontal cross-sectional view, taken on the line 3—3 of Fig. 2;

Fig. 4 is a transverse vertical cross-sectional view, taken on the line 4—4 of Fig. 1;

Fig. 5 is a transverse vertical cross-sectional view, taken on the line approximately indicated by the line 5—5 of Fig. 1;

Fig. 6 is a transverse cross-sectional view, taken on the lines 6—6 in Figs. 1 and 2;

Fig. 7 is a view similar to Fig. 2, but showing the locking and unlocking lever in fully locked position; and Fig. 8 is a view similar to Fig. 2, but showing the locking and unlocking lever in fully unlocked position.

Referring more particularly to the drawings, it will be seen that the coupling comprises a drawbar 1, the front portion 2 of which is shaped to provide a housing for the coupling elements to be described, and the rear portion of which comprises diverging arms 3, whereby the drawbar is adapted to be rigidly secured to a trailer (not shown).

Depending from a point intermediate the diverging arms 3 is a tubular member 4 which is removably secured to the drawbar and which provides a housing for a jackscrew 5, on the lower end of which is mounted a caster wheel 6. This tubular member, jackscrew and caster form the elements of a conventional type of screw lift, which is no part of the present invention. It need only be mentioned here that the caster wheel is utilized to support the front end of the trailer when uncoupled from the towing car and is adapted to be raised or lowered with the jackscrew by means of a detachable crank.

The housing 2 has downwardly extending parallel sides 7 and is closed at its front end by a wall 8. The inner surface 9 of this end wall is shaped to conform to and provide a seat for the spherical surface of a ball 10 which forms the tractor or towing-car element of the coupling. The ball 10 is mounted on a stud 11, the lower end of which is threaded so that it may be secured to the tractor or towing-car by means of the nut 12.

The ball is adapted to be maintained against the seat 9 by means of a pressure block 13, which is pivotally mounted on a pin 14 secured in the sides 7 of housing 2. The front surface 15 of this block is shaped to conform to and provide a seat for the spherical surface of the rear portion of the ball 10. The block normally hangs in a substantially vertical position, as shown in Figs. 2 and 7, and when in such position, it will be noted that the spherical surface of the ball is substantially entirely enclosed by the surfaces 9 and 15.

The block 13 is provided with a downwardly and rearwardly extending finger 16, adapted to be engaged for the purpose of swinging the block about its pivot pin as will be presently described. The finger 16 is provided on its lower surface with a shoulder or recess 17, and adjacent this shoulder is an indentation or notch 17'. The block is further provided with an abutment 18 which extends from the front face of the block and is disposed a short distance above the ball 10 when the block is in ball locking position, as in Figs. 2 and 7. The function of the shoulder 17 and abutment 18 will appear hereinafter. The rear surface of the block 13 is arcuately curved as at 19.

For the purpose of maintaining the pressure against the block 13 when in the locking position shown in Fig. 7, a locking and unlocking lever 20 is provided, which is pivoted at the rear to a pin 21 mounted in the sides 7 of the housing 2. This lever comprises a bottom wall or base 22 having a rounded edge 23 at the front, which is curved to conform with the curvature of the shoulder or recess 17 in the finger 16 of the block 13, and laterally spaced upstanding side walls 24, the front edges 25 of which are arcuately curved to engage the arcuately curved surface 19 of the pressure block. The surface 19 and the front edges 25 are of slightly different arcuate curvature for a purpose which will be presently described.

The lever 20 is further provided with an integral offset rearward extension 26 forming a handle whereby the lever may be rocked about its pivot pin, and with a second laterally disposed extension 27 adapted to engage a stop 28 on one of the walls 7 whereby to prevent downward movement of the lever beyond the locking position thereof, as shown in Fig. 7.

For the purpose of biasing the lever 20 to the pressure-block locking position shown in Fig. 7, and maintaining the same in such position, a coil spring 29 is provided which is interposed between the under surface of housing 2 and a seat 30 which is pivoted, as by a pin 31, to the lever 20, at a point intermediate the pin 21 and the edge 23 of the lever.

Having thus described the construction of the coupling, the operation, use and advantages of the same will now be described.

It will be assumed that the caster wheel 6 is in trailer supporting position and that the trailer coupling parts are as shown in Fig. 8, that is, ready for the trailer to be coupled to the towing car. The parts are brought to this position by rotating the lever 20 in a clockwise direction. In the course of such rotation of the lever, the finger 16 of the block 13 is engaged by the lever, thereby rotating the block in a counter-clockwise direction. This movement is continued until the parts are in the position shown in Fig. 8, the spring 29 at this time being fully compressed. The lever is then released, and the parts will remain in the position shown in Fig. 8, that is, the shoulder or recess 17 of the pressure block will be in engagement with the edges 23 of the lever. Due to the seating of the edge 23 in the recess or shoulder 17, and the fact that the sum of the distances from this seat to the axes of pins 14 and 21 is greater than the distance between these axes, the parts will be locked in the position shown. With the block and lever thus locked, neither can fall into the position shown in Fig. 7, until the pressure block has been rotated sufficiently to cause the shoulder 17 to clear the edge 23.

In order to couple the trailer with the towing car, the towing car is backed to such a position that the ball 10 is approximately under the pivot pin 14. The front end of the trailer is then lowered by manipulation of the screw jack, and as the ball 10 strikes the abutment 18, or some other portion of the surface 15 of the pressure block, the latter is rotated sufficiently to cause the shoulder 17 to move upwardly so as to clear the edges 23 of the lever. This unlocks the lever and permits it to snap downward as a result of the expansion of spring 29, the edges 23 initially moving into the notch 17', which, as shown, is sufficiently deep to freely receive these edges. In the course of the further downward movement of the lever 20, the arcuately curved edges 25 of the latter engage the arcuate surface 19 at the rear of the pressure block, and the wedging action of the edges 25 forces the pressure block towards the ball, locking the parts in the position shown in Fig. 7. Due to the fact that the surface 19 and edges 25 are of slightly different arcuate curvatures, as previously stated, not only is freedom from rattling while the towing car and trailer are in motion, insured, but an automatic take-up for any wear which may occur between the ball surface and the surfaces 9 and 15 is provided. In explanation of the latter it may be stated that as wear of the ball surface or surfaces 9 and 15 occurs, the natural downward pressure of the spring 29 forces the lever 20 into a new position and automatically takes up this wear. This take-up movement is, of course, limited, and the position of the lever shown in Fig. 7 is the extreme position, beyond which no further take-up can be accomplished. Movement of the lever below this position is, of course, prevented by the engagement of the extension 27 with stop 28. After the coupling has been effected, the caster wheel 6 is elevated from the ground to an inoperative position, and the entire screw lift removed from the drawbar.

In lowering the trailer onto the ball 10, should the ball fail to engage the pressure block 13 and release it, coupling would nevertheless be effected, as the instant the towing car and trailer are in motion, the natural back and forth play would result in sufficient movement of the parts to trip the pressure block and permit it to move to the ball-locking position. Succeeding movements of the towing car and trailer would result in the lever 20 working down to the position shown in Fig. 7, so that no danger would exist in the possibility of a poor connection. By incorporating the abutment 18 in the design of the pressure block, however, it is unlikely that the coupling and ball could ever be brought together without securing a tripping action which would release the pressure block. The coupling action, aside from the lowering of the trailer onto the ball, may therefore be considered as virtually automatic in character.

It may be further noted that the axis of pivot pin 21 is in a plane below the horizontal plane passing through the center of the ball 10, so that in the event that the spring 29 should break or in any way become inoperative, the natural tendency of the lever would be to assume the position shown in Fig. 7, and any likelihood or danger of the coupler working open and permitting the trailer to uncouple itself would be extremely remote. Furthermore, due to the fact that the bulk of the lever 20 is below a plane passing through the center of the ball and the axis of pivot pin 21, the strains imposed by sudden stops or backing up are transmitted by the ball through the pressure block and to the lever 20 in a direction which tends to lock the coupling rather than to unlock it.

In uncoupling the trailer, the jack screw is manipulated to cause the wheel 6 to engage the ground and to take the weight of the front end of the trailer off the ball 10 on the towing car. The handle 26 is then pulled downward until the pressure block and lever are locked in the position shown in Fig. 8. Upon further operation of the jack screw, the drawbar is lifted clear of the ball, the caster wheel 6 assisting in thus lifting the drawbar because it permits the trailer to creep forward sufficiently to cause the lower portion of the spherical surface 9 to clear the ball.

The use and design of the pressure block 13 are of extreme importance. The coupling could be made without utilizing such a pressure block by the simple expedient of shaping the forward end of the lever 20 to partially encompass the spherical surface of the ball 10. In order to secure an upward swing of such a lever, the spherical surface of the front end thereof could obviously not extend below a horizontal plane passing through the center of the ball, but the surface thus provided as a seat for the ball would result in a practical connection. The disadvantages of such an expedient, however, would be that it reduces the amount of wearing surface, thereby shortening the life of the connection and places a great deal more importance on the spring, in that failure of the spring would result in the coupler automatically opening. In the present construction, on the other hand, through the use of the pressure block, a substantially full spherical seat for the ball is provided, and, as previously stated, the necessity for the block to be swung upwardly before uncoupling makes accidental opening of the coupling virtually impossible.

Finally, it may be noted that the forward portion of the spherical seat for the wall is an integral part of the housing or drawbar. This makes for safety, as it eliminates the use of a separate piece for this seat, which might become loosened and possibly fall off, permitting the trailer to become uncoupled.

It is thus seen that a coupling has been provided which is as nearly automatic in operation and foolproof as is possible, the only attention required consisting in unlocking the pressure block lever. Once unlocked, however, the parts are maintained in unlocked condition, so that recoupling requires no additional operation.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a coupling for trailers, a ball, a drawbar, the forward end of which is formed to provide a seat for said ball, a block pivotally mounted on said drawbar and providing a seat for another portion of said ball, said block being lockable in a position wherein said ball may be uncoupled from said drawbar, and a locking lever adapted to be rotated to force said block against said ball, said lever being mounted on said drawbar at a point below a horizontal plane passing through the center of said ball, and having one end thereof in engagement with said block during said rotation of the lever.

2. In a coupling for trailers, a ball, a drawbar forming a seat for one side of said ball, a block pivotally mounted on said drawbar and providing a seat for the other side of said ball, said block having a finger extending therefrom and formed integrally therewith, and a locking lever pivotally mounted on said drawbar and adapted upon rotation thereof in one direction to directly engage said block to force the block against said ball, and upon rotation in the other direction to directly engage and lift said finger to a position wherein the block is elevated and in a position to permit uncoupling of the ball from the drawbar.

3. In a trailer coupling, a coupling element, a drawbar, a pressure block pivotally mounted on said drawbar and normally engaging said coupling element to couple the latter with said drawbar, said block being movable to a position in which said coupling element may be uncoupled from said drawbar, and toggle means for locking said block in said position, said toggle means comprising a lever pivotally mounted on said drawbar and a finger projecting from and formed integrally with said block, the lever directly engaging said finger, and spring means interposed between said drawbar and lever and acting to limit movement of said lever in an upward direction.

4. In a trailer coupling, a coupling element, a drawbar, a pressure block pivotally mounted on said drawbar and normally engaging said coupling element to couple the latter with said drawbar, said block being movable to a position in which said coupling element may be uncoupled from said drawbar, toggle means for locking said block in said position, and means operative in response to the coupling of said element with said drawbar for automatically releasing said block from said position.

5. In a trailer coupling, a coupling element, a drawbar, a pressure block pivotally mounted on said drawbar, and adapted to engage said coupling element to couple the latter with said drawbar, toggle means for locking said block in a position wherein said coupling element may be uncoupled from said drawbar, and means operative in response to the coupling of said element with said drawbar for automatically releasing said toggle means from its said locking position, and means operative upon said release for automatically moving said block to engage said coupling element.

CARL R. HENNICKE.